US009958956B2

(12) United States Patent
Jiang et al.

(10) Patent No.: US 9,958,956 B2
(45) Date of Patent: May 1, 2018

(54) DATA INPUT DEVICE FOR INFORMATION PROCESSING APPARATUS

(71) Applicant: Panasonic Avionics Corporation, Lake Forest, CA (US)

(72) Inventors: Feng Jiang, Irvine, CA (US); Shrenik Shah, San Clemente, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 98 days.

(21) Appl. No.: 14/946,412

(22) Filed: Nov. 19, 2015

(65) Prior Publication Data

US 2016/0170499 A1 Jun. 16, 2016

Related U.S. Application Data

(60) Provisional application No. 62/092,052, filed on Dec. 15, 2014.

(51) Int. Cl.
*G06F 3/023* (2006.01)
*G06F 3/044* (2006.01)
*G06F 3/00* (2006.01)
*G06F 1/16* (2006.01)
*G06F 3/02* (2006.01)
*B64D 11/06* (2006.01)
*B64D 11/00* (2006.01)

(52) U.S. Cl.
CPC ...... *G06F 3/0233* (2013.01); *B64D 11/00151* (2014.12); *B64D 11/0638* (2014.12); *G06F 1/1662* (2013.01); *G06F 3/002* (2013.01); *G06F 3/0202* (2013.01); *G06F 3/044* (2013.01)

(58) Field of Classification Search
CPC combination set(s) only.
See application file for complete search history.

(56) References Cited

U.S. PATENT DOCUMENTS

| 8,325,141 | B2 | 12/2012 | Marsden |
| 2006/0075934 | A1 | 4/2006 | Ram |
| 2011/0037624 | A1 | 2/2011 | Pance et al. |
| 2011/0291938 | A1 | 12/2011 | Wu et al. |

FOREIGN PATENT DOCUMENTS

| EP | 15194236.4-1959 | 1/2016 |
| WO | 2014075040 | 5/2014 |

OTHER PUBLICATIONS

European Patent Office, Communication pursuant to Article 94(3), dated Jan. 24, 2018, 6 pages, Rijswijk, Netherlands.

*Primary Examiner* — Van N Chow
(74) *Attorney, Agent, or Firm* — Brian Furrer (57) ABSTRACT

A device for inputting data into an information processing apparatus using a communication cable. The device includes a sensing field including signal lines. The sensing field generates one or more signals when an object is proximate thereto. The device further includes at least one processor connected to the signal lines. The processor receives the signals and generates data based on the signals. The device additionally includes a port in communication with the processor for data output. The port is configured to connect to the cable end communicate the data over the cable to the information processing apparatus. The device includes a light source configured to illuminate keyboard symbols corresponding to areas of the sensing field. The device also includes an exterior surface covering the sensing field and obscuring the keyboard symbols from visibility unless the light source is providing illumination.

7 Claims, 7 Drawing Sheets

DATA INPUT DEVICE FOR INFORMATION PROCESSING APPARATUS

CROSS-REFERENCE TO RELATED APPLICATIONS

This application claims priority from U.S. provisional patent application Ser. No. 62/092,052, filed on Dec. 15, 2014. Priority from the foregoing provisional patent application is expressly claimed, and the disclosure of the provisional application is hereby incorporated herein by reference in its entirety and for all purposes.

TECHNICAL FIELD

The present invention relates generally to input devices for information processing apparatus, and more particularly to keyboards and keypads having dual uses.

BACKGROUND

Information processing apparatus has continued to shrink in size as processors have become more powerful and efficient. The smaller size is advantageous due to decreased weight, space, end power requirements and also for increased performance. One of the difficulties with smaller information processing apparatus is how to input data from a user into the apparatus, especially for mobile applications. In particular, providing a keyboard or keypad sufficiently large for the user to efficiently type on, e.g., appropriate tactile feedback, sufficient space for the users hands to rest comfortably on the keyboard, and etc., while not having a significant adverse impact on mobility.

Attempts have been made to address the foregoing difficulty in severe ways. Some types of information processing apparatus have a physical keyboard or keypad integrated with the device, such as frequently seen with laptop computers. Other devices may have slide-out keyboards or keypads, most commonly seen with some kinds of mobile phones. While satisfactory for some users, physical keyboards and keyboards generally add weight and size to the apparatus and are thus viewed by some as undesirable.

More recent solutions have attempted to substitute physical keyboards with on-screen virtual keyboards and keypads, such as information processing apparatus in the form of smart phones and tablets. While lightweight, virtual keyboards and keypads remain difficult to use due to a significant portion of the display being covered by an image of the virtual keyboard or keypad. In addition, the size of the virtual keyboard or keypad is constrained by the size of the display of the information processing apparatus. Further, virtual keyboards or keypads do not facilitate rapid data entry due to a lack of tactile feedback as virtual keys are pressed by the user.

Another attempted solution has been to provide detachable physical keyboards. This may be a cover for a tablet and include foldout portions for supporting the tablet in an upright position. While providing a more efficient input method compared to a virtual keyboard or keypad, it has the disadvantage of adding weight and requiring additional space.

Disclosed herein is a device for inputting data into information processing apparatus that attempts to address at least some aspects of the foregoing difficulties with physical keyboards, keypads and/or touchpads.

SUMMARY

In one aspect, a device is provided for inputting data into an information processing apparatus using a communication cable. The device need not be carried with the information processing apparatus as the device may be part of the environment in which the information process apparatus is used, such as part of a vehicle or a desk. The device includes a sensing field having a plurality of signal lines. The sensing field generates one or more signals when an object is proximate the sensing field and communicates the signals over the signal lines in which the signals are indicative of location of the object. The sensing field is preferably a touch panel, and more preferably, a capacitive type touch panel.

The device includes a processor connected to the signal lines in which the processor receives the signals from the sensing field and generates data based on the signals received. Further included is a port in communication with the processor in which the processor outputs data to the port. The port is configured to connect to the cable and communicate the data received from the processor via the cable to the information processing apparatus.

The device includes a light source configured to illuminate keyboard symbols corresponding to areas of the sensing field. An exterior surface covers the sensing field and obscures the keyboard symbols from visibility unless the tight source is providing illumination. The light source provides sufficient light when illuminated such that the keyboard symbols are visible through the exterior surface, at least within the interior of a vehicle or other structure that shields the exterior surface from direct sunlight.

In another aspect, the device may used as a tray, such as when used on a vehicle or as a writing surface when used in a stationary environment. When the keyboard symbols are obscured from visibility due to the light source not being illuminated, the device does not have the appearance of a keyboard and appears as a tray or other inert surface, such as the surface of a desk. The device further includes depressions disposed over the exterior surface to increase friction between the exterior surface and an object in contact therewith for facilitating use of the device as a tray. The depressions may be formed by blasting the surface with small particles or integrally formed in the surface such as when performing injection molding to form the surface. In at least some embodiments, the device preferably includes a cylindrical recess defined in the exterior surface for receiving a beverage container therein.

The light source is preferably formed of a light guide and LEDs in optical communication with the light guide in which the LEDs emit light to illuminate the light guide and thereby keyboard symbols. The port is preferably a USB port in which the port receives power from the information processing apparatus when connected thereto via the cable and supplies power therefrom to the light source for illumination thereof, and more particularly, to the LEDs that illuminate the light guide.

A support body encloses the sensing field. The support body includes a top surface and a bottom surface in which the top surface obscures the keyboard symbols from visibility unless the keyboard symbols are illuminated by the light source. Preferably, the device includes at least one mount. The mount is configured to support the support body rotatably between a deployed position with the to surface accessible and a stowed position with the to surface inaccessible.

Providing for a stowed position facilitates use of the device for use as a tray table on vehicles, such as aircraft, which often require stowage of trays during landings and take-offs for passenger safety. The deployed position orients the keyboard symbols facing substantially upward in the vehicle. As described earlier, this surface may further include a cylindrical recess defined in the exterior surface for receiving a beverage container therein in at least some embodiments.

The port is configured to connect to a cable and communicate data received from the processor of the device via the cable to an information processing apparatus. In an alternate embodiment, the device may include a wireless connection instead for communicating wirelessly with the information processing device. In yet another alternate embodiment, the device may include both a port for connecting to a cable and also a wireless port for wireless communication with an information process apparatus.

BRIEF DESCRIPTION OF THE DRAWINGS

The drawing figures are not necessarily to scale and do not represent every feature, but are diagrammatic to enable those of ordinary skill in the art to make and use the invention without undue experimentation and do not limit the scope of the claims. Embodiments in accordance with the invention and advantages will therefore be understood by those of ordinary skill in the art by reference to the detailed description below together with the following drawings figures, wherein:

DETAILED DESCRIPTION

Figure 1:
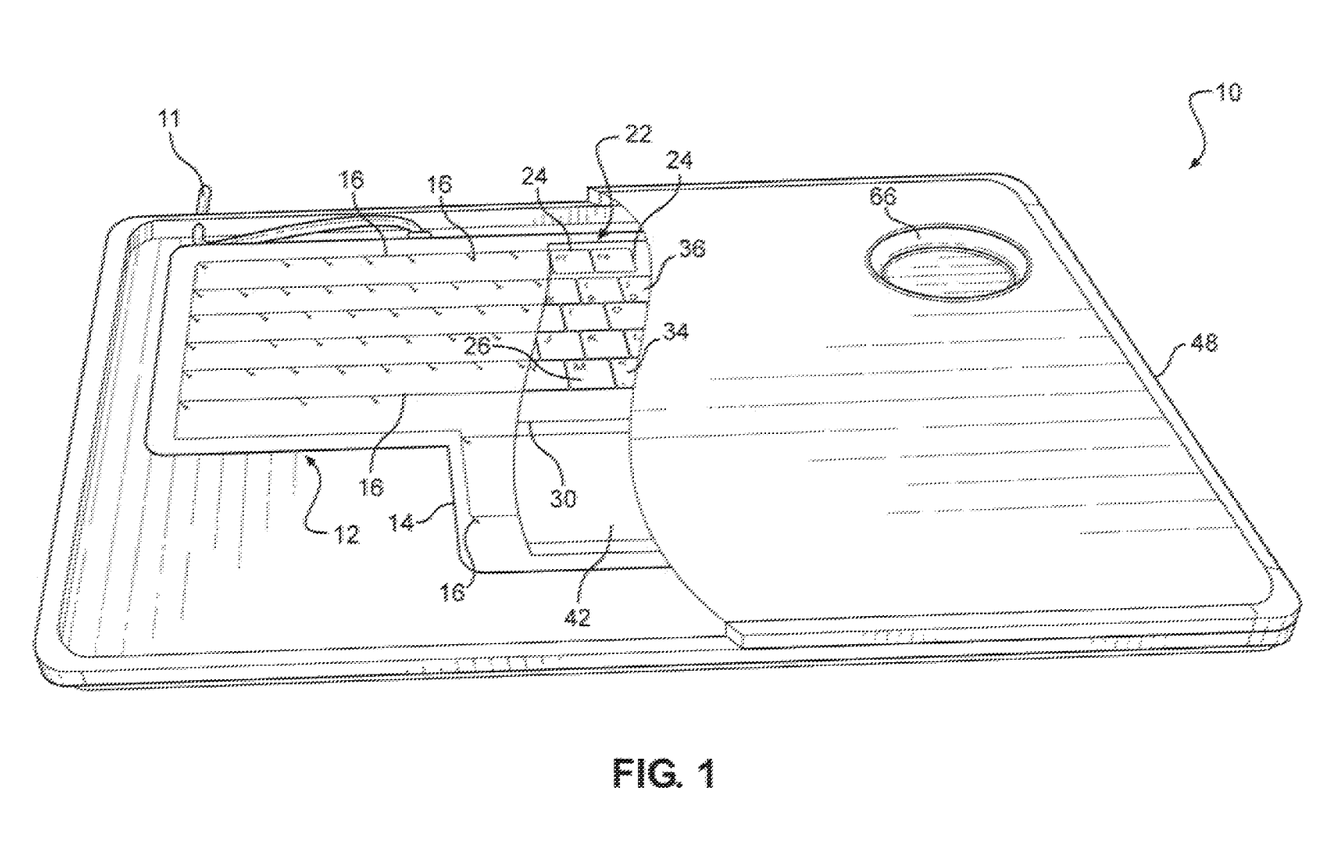
FIG. 1 schematically illustrates a partial cut-away to perspective view of an exemplary embodiment of a device for inputting information into an information processing apparatus.

FIG. 1 schematically illustrates a partial cut-away view of an exemplary embodiment of device, indicated generally by reference numeral 10, in accordance with the invention. The device 10 is for inputting data into an information processing device and for use as a tray, such as an aircraft or other vehicle or in a stationary environment. The information processing apparatus may be a smart monitor, personal computer, tablet, smart or cellular phone, phablet (combination phone and tablet), laptop, or other personal electronic device ("PED"). Wearable information processing devices are also included within the definition of a PED as used herein, such as a smart watch, bracelet, or smart glasses, e.g., spectacles marketed under the trademark GOOGLE GLASS.

As will be explained in the following paragraphs, an electrical or communication cable 11 may be used to connect the device 10 in communication with the information processing apparatus or a wireless connection may be used. The device 10 may used as a keyboard, keypad, touch pad or combination thereof for a user to input information into the information processing apparatus.

The device 10 includes a sensing field indicated generally by reference numeral 12. The sensing field 12 preferably comprises a touch sensitive surface or touch panel 14. The touch panel 14 has the capability to sense an object proximate the touch panel without requiring direct contact with the touch panel, for example, one or more digits of e users hand or a stylus. Touch panels of this kind include types that sense the location of an object proximate the touch panel via changes in capacitance. This advantageously permits the touch panel 14 to be covered by at least one protective layer to protect the touch panel from contaminants, such as food crumbs, dust, particulates, and/or liquids. In addition, capacitive type touch panels have the ability to sense multiple objects proximate thereto, such as a user pressing several digits simultaneously against the touch panel 14, which is useful for inputting data via gestures. Suitable touch panels are commercially available from suppliers such as Blue Sparq Inc. and Rapid Keypads, both of Cape Coral, Fla., USA.

With continued reference to FIG. 1, the sensing field 12 includes a plurality of signal lines 16. The sensing field 12 generates a signal when an object is proximate the sensing field and communicates the signals over the sensing lines 16. The signals are indicative of location Of the object, and in particular, indicative of the location of the object within the plane of the sensing field, for example, x, y coordinates or other location indicia, such as within a particular area.

Figure 2:
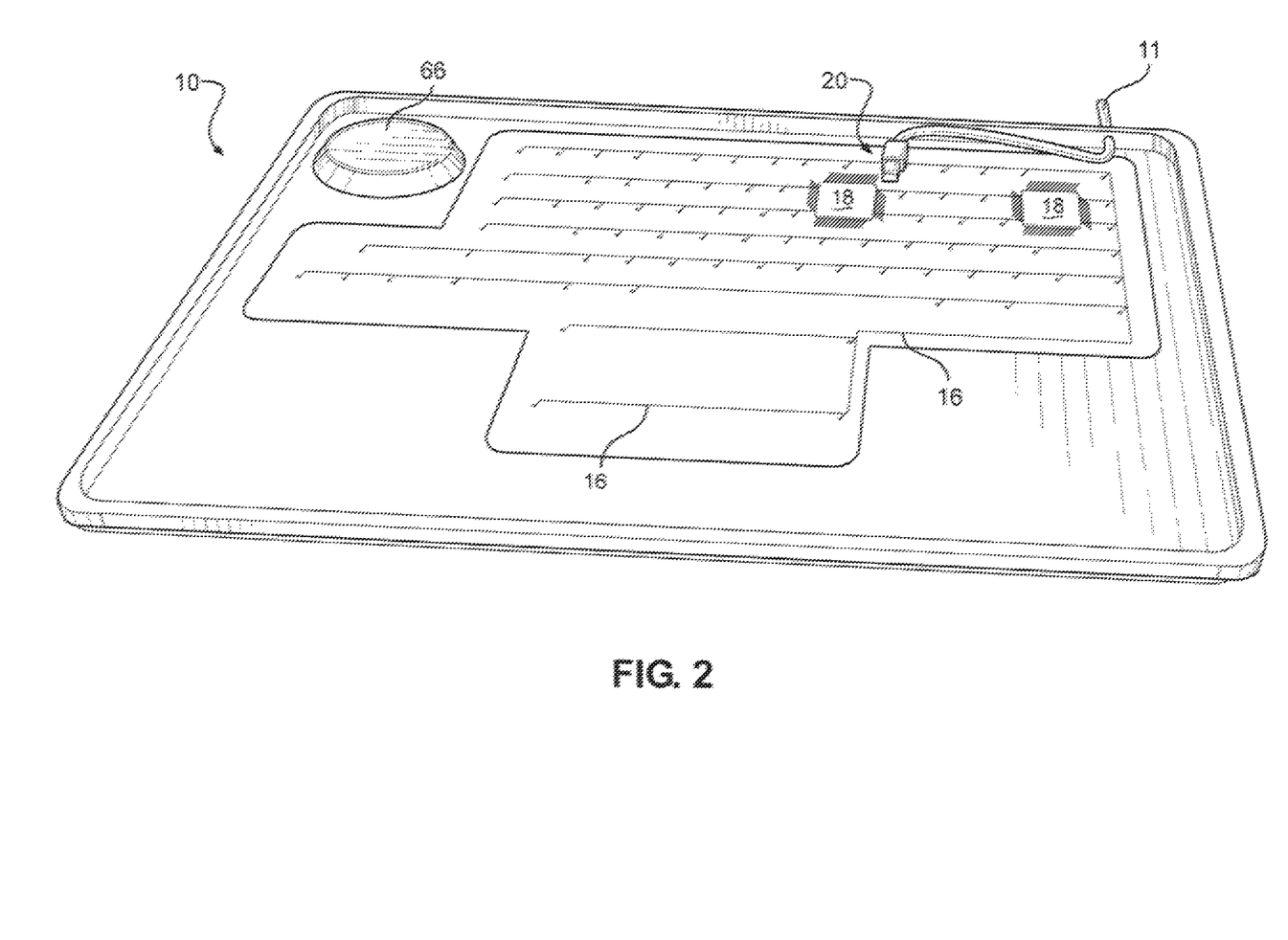
FIG. 2 schematically illustrates a partial cut-away bottom perspective view of the device of FIG. 1 with part of the internal structure removed.

FIG. 2 illustrates the opposite or bottom side of the device 10, with part of the internal structure removed. Referring to FIG. 2, the device 10 includes at least one controller or processor 18, to which signal lines 16 connect. The processor 18 receives the signals communicated over the signal lines 16 from the sensing field 12. Based on the indicated location of the object, the processor 18 generates data. More particularly, the processor 18 is connected in electronic communication with a port, indicated generally by reference numeral 20 in FIG. 2. The data generated by the processor 18 or processors 18 is output to the port 20. For compatibility with most information processing apparatus currently in use by consumers, the port 20 preferably comprises a USB (Universal Serial Bus) port for receiving at least one of a standard USB, mini-USB and micro-USB connector at the end of the cable 11 connecting to the port 20. The other end of the cable 11 may have the same type or another connector for connecting to the information processing apparatus, e.g., a PED.

In alternate embodiments, a port 20 complying with other types of standards could be used, for example a port compliant for receiving a connector on cables marketed by Apple Inc. under the trademark LIGHTNING. The data is communicated over the cable 11 connected to the port 20 to the information processing apparatus, which as described earlier, may be a laptop computer, tablet, smart phone, phablet, mart watch, or other type of PED.

Returning to FIG. 1, a light source or guide indicated generally by reference numeral 22 is disposed proximate the sensing field 12. The light guide 22 illuminates to indicate key boundaries and symbols corresponding to areas of the touch panel 14, for example function keys 24, alphanumeric characters 26, mathematical symbols and punctuation marks 34 numerical characters and symbols 36, and etc. The light guide 22 may also indicate a functional area that does not have a symbol or character displayed thereon, such as a space bar 30 and/or touch pad area 42.

Figure 3:
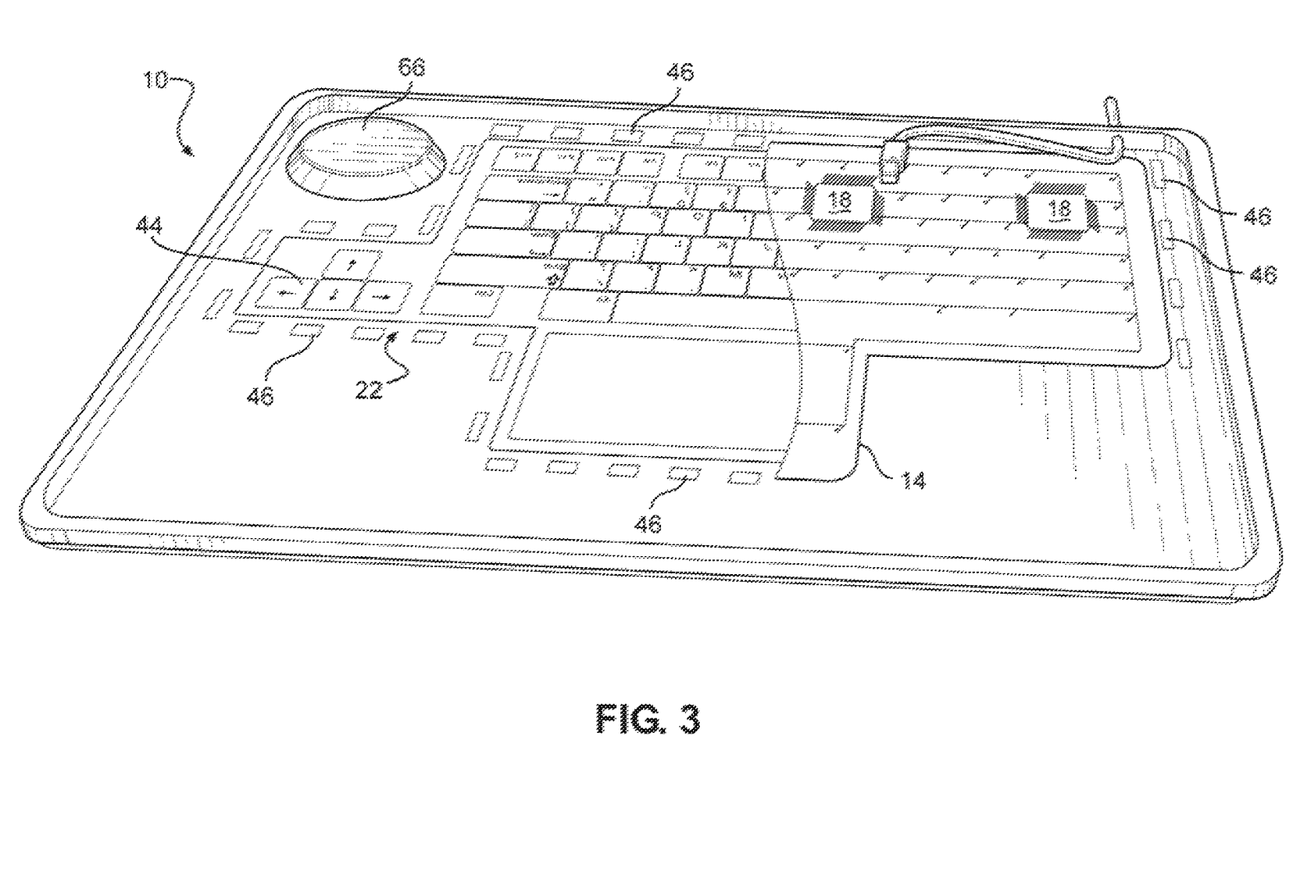
FIG. 3 schematically illustrates another perspective view of the device from the bottom, with a touch panel thereof partially cut away to better illustrate a light source in the device.

FIG. 3 illustrates another view of the device 10 from the bottom, with the touch panel 14 partially cut away to show the light guide 22. The light guide 22 comprises acrylic or other substantially clear or transparent plastic structure having areas defining keys 44 engraved or etched with one or more symbols associated with that key. Light from an illumination source is directed into at West one edge of the plastic structure of the light guide 22. The light travels through plastic structure of the light guide 22 and when the light encounters an etching, it is scattered, rendering the symbol more brightly lit than the surrounding area. Preferably, the etching is performed with a laser.

The light additionally scatters froth the edges of the areas defining keys, which also appear more brightly lit to define the boundaries of the key or functional area, such as a touch pad or space bar. The illumination source is preferably LEDs (light emitting diodes) 46 spaced around the edges of the light guide 22. This is sometimes referred to an edge-lit display, in alternate embodiments, other types of lighting may be used, for example, a back lit liquid crystal display (LCD) or an LED provided for each key or functional area to render the symbol and/or boundaries thereof visible to a user when the LEDs are illuminated.

Figure 4:
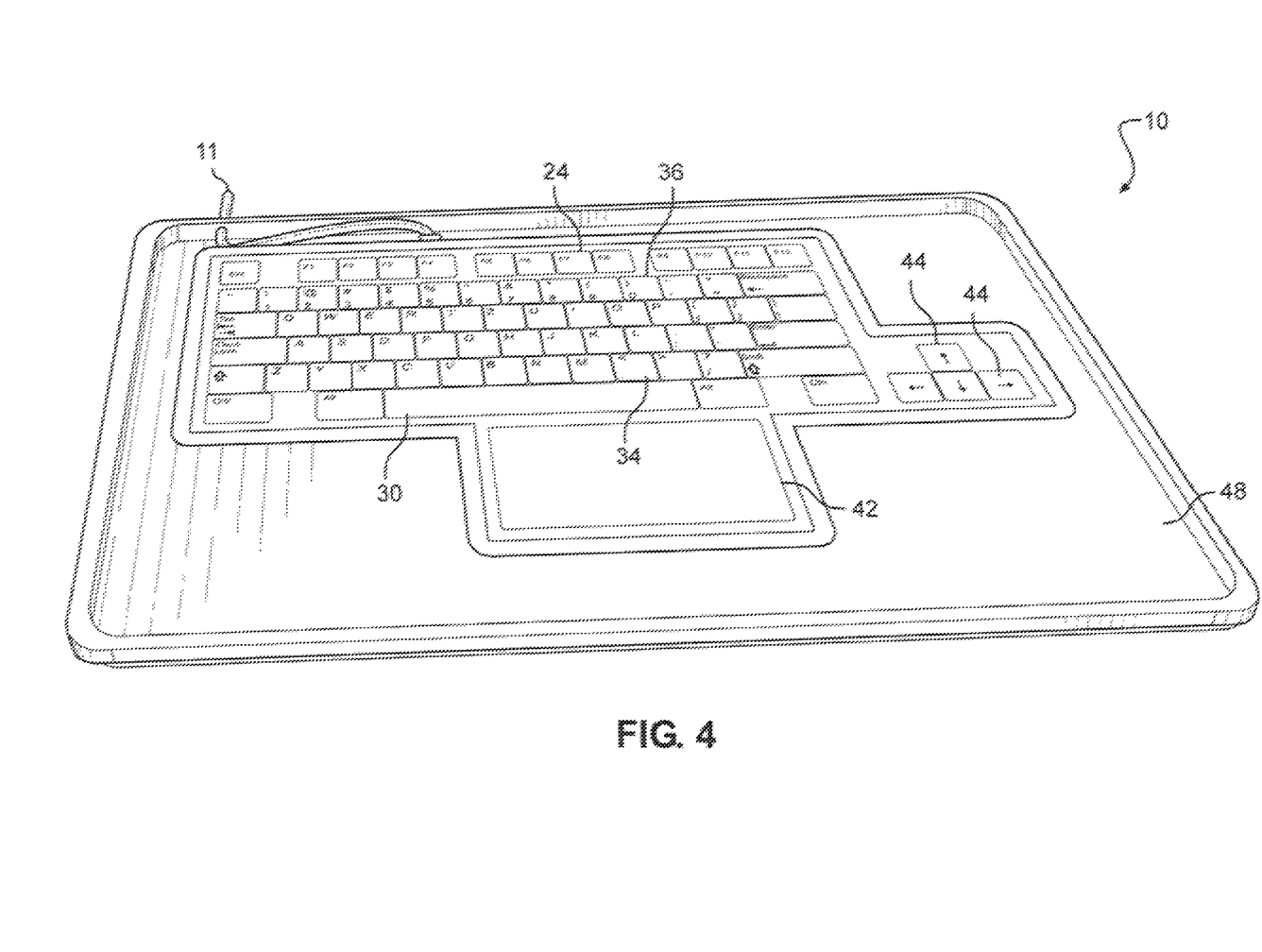
FIG. 4 schematically illustrates the device of FIG. 1 with the light source illuminated.

Referring to FIG. 1 again, an exterior surface 48 covers the sensing field 12. The exterior surface 48 obscures the keyboard symbols from visibility to a user unless the light guide 22 is illuminated. As shown in FIG. 4, when the light guide is illuminated, keys 24, 26, 34 spacebar 30, touchpad 42 and other features are visible through the exterior surface 48. In particular, FIG. 4 schematically illustrates the device 10 with the light guide 22 illuminated. Referring to FIG. 1, when the illumination to the light guide 22 is extinguished, the light guide 22 and etchings thereon are not visible through the exterior surface 48, in addition, the boundaries of keys and other areas, such as the touch pad 42, are not visible and are completely or at least substantially hidden from view.

Figure 5:
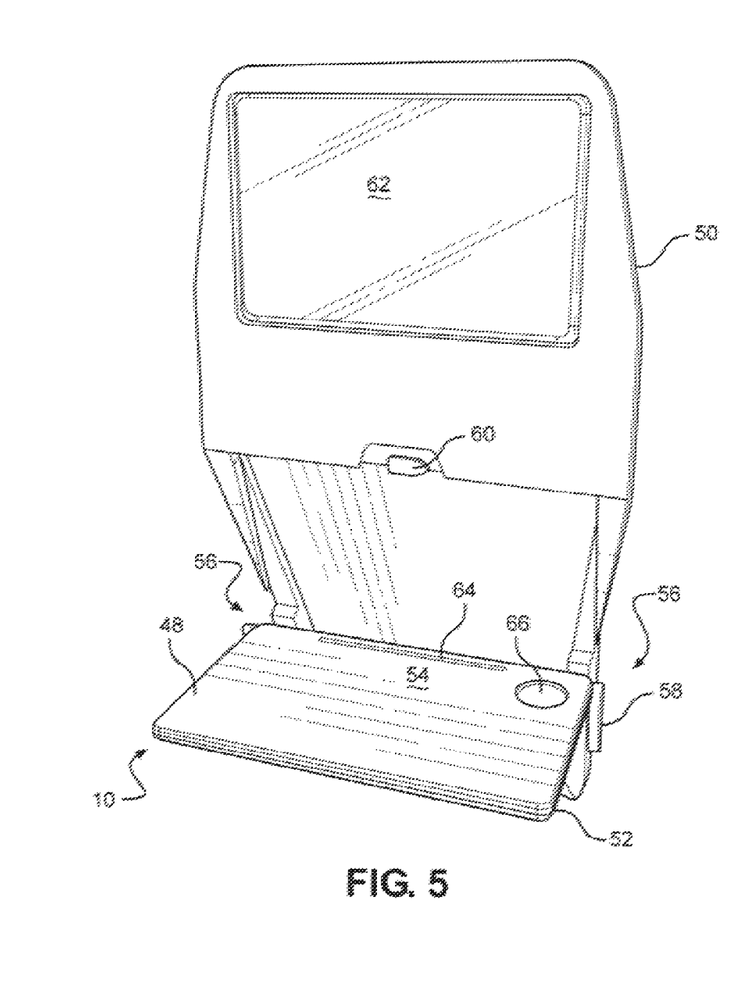
FIGS. 5 and 6 schematically illustrate the device of FIG. 1 including mounts and attached to a seat with the light source respectively not illuminated and illuminated, while the device is in a deployed position.
Figure 6:
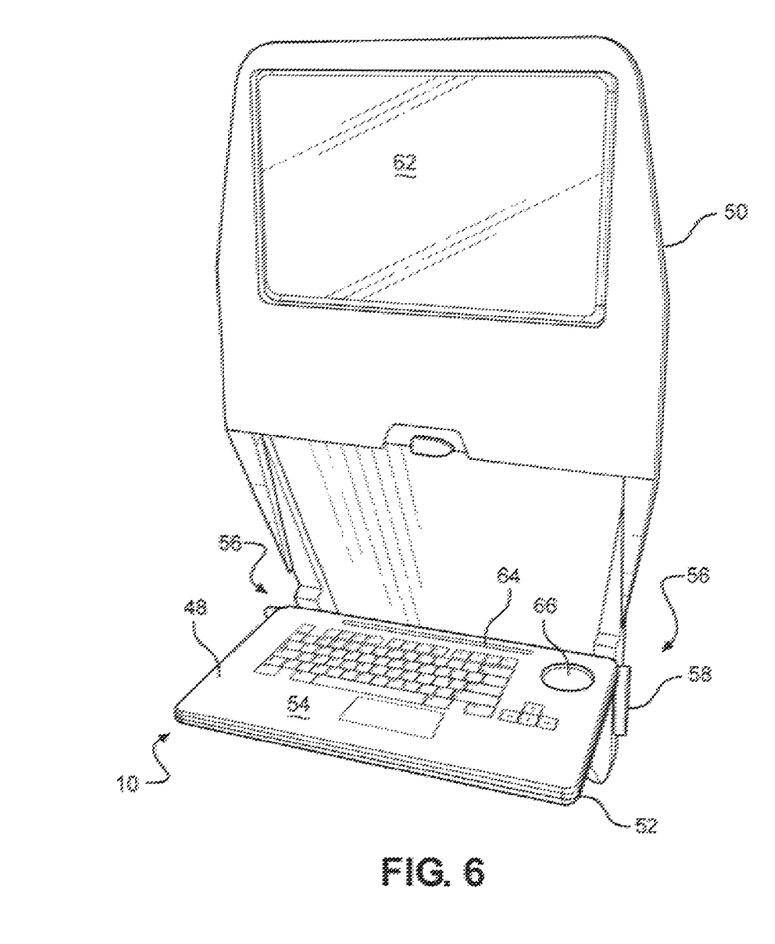

This is also illustrated in FIGS. 5 and 6. In particular, FIG. 5 illustrates the situation where the light guide 22 is not illuminated. Accordingly, the exterior surface 48 obscures the light guide 22 and etchings thereon are not visible. Hence, the device 10 appears as an ordinary seatback tray. FIG. 6 in contrast illustrates the light guide 22 illuminated. In this situation, etchings, and boundaries for keys and functional areas are visible through the exterior surface 48.

The sensing field 12 is able to sense an object or objects proximate thereto through the exterior surface covering 48 of the device 10. In particular, the sensing field 12 detects changes in capacitance to sense an object. The exterior surface covering 48 is sufficiently thin that an object in contact with the exterior surface covering affects capacitance of the sensing field 12.

As described earlier, the sensing field 12 comprises a touch panel 14. The touch panel 14 is preferably a projected capacitive touch type, including a matrix of rows and columns of conductive material layered on sheets of glass to form a grid. Voltage applied to the grid creates an electrostatic field. When an object, such as a digit of a user's hand is proximate, the electrostatic field distorts at that location and changes the capacitance. The grid arrangement permits the capacitance to be sensed at intersections on the grid to determine the location of the object and track its movement.

The detected changes in capacitance are communicated over the signal lines 16 to the processor or processors 18. Based on which intersection or intersections of the grid detected the capacitance change, the signals are indicative of location of the object within the plane of the sensing field 12, i.e., the coordinates of the object. The processor 18 thereafter executes logic to determine the data that should be output to the port 20 (see FIG. 2) in accordance with the coordinates of the object. Keyboard logic is provided with keyboards commercially available from the aforementioned Blue Sparq Inc. and Rapid Keypads. Keyboard logic is also described in U.S. Pat. No. 8,325,141 to Marsden, issued Dec. 4, 2012, the disclosure of which is hereby incorporated by reference in as entirety.

For a keyboard or keypad, as opposed to a touch pad or track pad, it is generally important only that the object is within the boundary defining a key. In these areas, the touch panel 14 need only detect a change of capacitance within the boundary defining the area and precise location is not necessary. In particular, a grid may not be necessary within such areas and a single electrode or sensor may suffice. In other areas, such as in a track pad or touch pad 42, more precise location information is required and a grid of sensors is required to detect object location and track movement, such as for controlling a cursor on a display.

For a relatively simple keyboard or keypad, a single processor 18 is typically sufficient. However, for more complex arrangements having many keys and functional areas, such as a touch pad 42, and key combinations such as a control, alt, and other keys that modify yet other keys when pressed in combination therewith, a plurality of processors 18 may be provided as indicated in FIG. 3. A suitable keyboard assembly having a touch panel 14, processors 18, light guide 22, and port 20 is commercially available from the sources previously listed, specifically, Blue Sparq Inc, and Rapid Keypads, both of Cape Coral, Fla., USA.

The exterior surface 48 is preferably formed of a plastic material, and more preferably a thermoplastic, such as polyethylene (PE), polypropylene (PP), or acrylonitrile butediene styrene (ABS), for example. If the device 10 is intended for use in the transportation industry, the exterior surface 48 is further preferably a thermoplastic formed from a mixture or alloy of polyvinyl chloride (PVC) and an acrylic and is fire retardant. For aviation applications in particular, the material should meet flammability and other requirements imposed by the appropriate authorities, such as the Federal Aviation Administration (FAA) in the US and the European Aviation Safety Agency (EASA) in Europe, or the controlling authority of the country where the device 10 is intended for use. Suitable material for the exterior surface 48 is commercially available from Boltaron Inc. of Newcomerstown, Ohio, USA, including material meeting requirements for the aviation industry.

Returning to FIG. 5, the drawing figure illustrates an application of the device 10 for use in the transportation industry. More particularly, FIGS. 5 and 6 illustrate the device 10 mounted to the back of a seat 50 as is common in seats for aircraft, trains, ferries, and other forms of mass transit having rows of seats 50 along the vehicle.

The exterior surface 48 encloses the sensing field 12, forming a support body 52 in which the sensing field is disposed. The support body 52 includes a to surface 54, which obscures the keyboard symbols from view unless illuminated by the light guide 22. FIG. 5 shows the keyboard symbols obscured on the light guide 22. Accordingly, the device 10 appears as an ordinary seatback tray. An advantage of the device 10 is that the internal components are protected from the external environment by the exterior surface 48. Hence, if there is spillage on the top surface 54 of the device 10, such as liquid or food, the internal components, such as the sensing field 12 and light guide 22 are protected. Only the port 20 is exposed, which is preferably along an edge and thus not directly exposed to spillage on the top surface 54.

Figure 7:
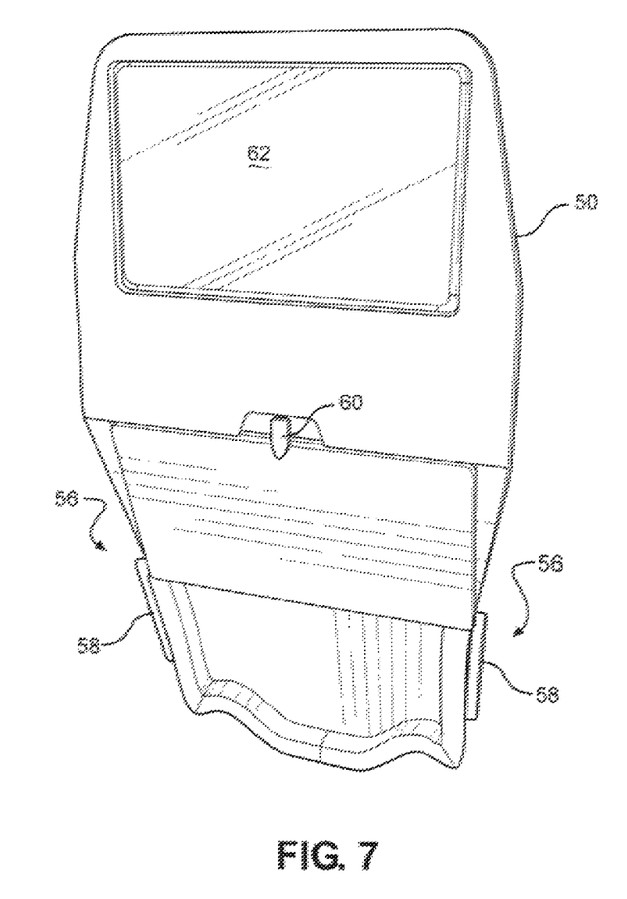
FIG. 7 schematically illustrates the device of FIGS. 5 and 6 in a stowed position.

FIGS. 5 through 7 illustrate at least one mount 56 disposed in the support body 52. Preferably, there are opposing mounts 56, one disposed symmetrically on each side of the support body 52. Each mount 56 may comprise a recess in the support body 52 into which a projection or pin from an arm 58 is received. The support body 52 pivots or rotates around the pins between a deployed position in which the top surface 54 of the device is accessible as in FIGS. 5 and 6, and a stowed position as shown in FIG. 7 in which the top outface is inaccessible. A latch 60 is further preferably provided for locking the device 10 in the stowed position as in FIG. 7 and for unlocking the device for deployment into the position shown in FIGS. 5 and 6.

As will be appreciated, the device 10 may be used as a keyboard. For example, the communication cable 11 visible in FIGS. 11 may connect to a monitor 62, preferably a smart monitor, installed in the back of the seat 50. The advantage, of this arrangement is that it eliminates the need for a personal control unit as is often provided with in-flight entertainment (IFE) systems for providing input from a passenger into the monitor 62, such as film and audio selections, inputting information for playing games, typing messages for email and social media, and/or refreshment selections, such as for food and drink.

In addition, as the port 20 is preferably in accordance with the USB standard, a passenger may connect their own PED to the device 10 with the cable 11 or their personal cable and use the device 10 to input information into their PED. In particular, the port 20 receives power through the communication cable 11 from the information processing apparatus to which the cable is connected, i.e., the PED or smart monitor 62. The power that the port 20 receives is used to power the device 10, i.e., illuminate the light guide 22 and supply power to the processor or processors 18, and sensing field 12. More particularly, a USB connection provides data lines, a ground, and a power connection. Thus, when the device 10 is connected to the smart monitor 62 or a PED, the device 10 is powered via the USB power connection and the symbols for keys and functional areas are visible through the top surface 54 of the device.

To further facilitate use with a PED that is in the form of a table or tray, the device 10 may include a trench or groove 64 as shown in FIGS. 5 and 6. The groove 64 is near the rear edge of the top surface 54 of the device 10 and is for receiving the edge of a tablet, smart phone, or phablet computing device to hold it up for a user in an upright position.

As the device 10 does not have keys that translate upward and downward when pressed for providing tactile feedback to a user, the top surface 54 may vibrate to provide tactile or haptic feedback. Preferably a low power vibration device is used, such as a piezoelectric vibrator or other type that is commonly used in smart phones, phablets and tablets. Alternatively, a light may flash to indicate that a keystroke has been registered by the device 10, or the device could both vibrate and flash one or more lights. Audio feedback could be provided as well, such as a beep or click if the passenger or user is using headphones with the PED or smart monitor 62 connected to the device, so as not to disturb other nearby passengers. Depending on cost concerns, a vibrator could be provided for each key for tactile feedback to a user.

The device 10 is also intended for use as tray. For this reason, the upper surface 54 of the device 10 includes a cylindrical depression 66 for receiving a beverage container such as a cup, glass, or can. Preferably, at least the top surface 54 of the device 10 has been roughened to increase the coefficient of friction between the top surface 54 and an object in contact therewith. This helps to prevent objects from sliding off the top surface 54 should the vehicle tilt during traveling such as movement in a curved path or encounter turbulence in the case of an aircraft or rough seas in the case of a ship or ferry. The roughening may be applied by blasting the exterior surface 48 of the device 10 with beads and/or other particles or be incorporated therein in a mold for forming the exterior surface 48 from plastic material, or by other known methods. Ideally, the exterior surface 48 has a matte finish. A sensing field 12, processors 18, pod 20, and light guide 22, covered by a suitable exterior surface 48 is commercially available from Abatek (Americas), Inc. of Duluth, Ga., USA.

While the drawing figures have illustrated the device 10 as formed in the shape of tray, in alternate embodiments it may be formed in the armrest of a seat or other locations and could have other shapes or different arrangements for the keys and touch pad. In yet other alternate embodiments, it may be feared in the surface of a desk, such as in a classroom.

As described earlier, the port 20 shown in FIG. 2 may be a wireless connection. For example, it may be a transceiver compliant with the Bluetooth standard for communicating data to an information processing apparatus. The advantage of this arrangement is that many PEDs have Bluetooth capability and it eliminates the need for a wired connection, i.e., cable 11. If the port 20 is a wireless connection, the device 10 is provided with alternative source of power, such as from a seat back monitor 62 as in FIGS. 5-7. Alternatively, power may be provided from another source, such as a cable from an electrical or distribution box. The wireless connection may be according to other standards as well, such as those commonly used to wirelessly connect keyboards and mice using RF to an information processing device.

While embodiments may be illustrated or described as having certain components, additional, fewer, or different components may be used or substituted. For example, additional ports 20 could be provided instead of a single pod in different sires to accommodate different cables. For example, a port 20 for receiving a standard USB connector, another port for receiving a mini-USB connector, and another for receiving a micro-USB connector. Both a wire port 20 and a wireless port could be provided. FIGS. 5 and 6 illustrate a pair of arms 58 disposed on either side of the support body 52. In alternate embodiments, a single support arm 58 could be employed that attaches to one edge of the device 10. This is common in seats in vehicles in which a tray stows in an armrest of the seat. FIG. 3 illustrates an embodiment having a pair of processors 18, in alternate embodiments a single more powerful processor could be used or a simplified keyboard layout requiring less computational resources and having a single processor. In the illustrated embodiment, a light source or light guide 22 is proximate the sensing field 12. In alternate embodiments, the light source or light guide 22 may be provided at another location within the support body for the device 10, or other another type of light source may be substituted.

Since changes can be made as described, the present examples and embodiments are to be considered as illustrative and not restrictive and the invention is not to be limited to the details given herein, but may be modified within the scope and equivalence of the appended claims.

The invention claimed is:

1. A device for inputting data into an information processing apparatus on a vehicle using a cable, the device comprising:

a sensing field including a plurality of signal lines, the sensing field generating one or more signals when an object is proximate the sensing field and communicating the signals over the signal lines indicative of location of the object;

a processor connected to the signal lines in which the processor receives the signals from the sensing field and generates data based on the signals received;

a port in communication with the processor which outputs data thereto, the port being configured to connect to the cable and communicate the data received from the processor over the cable to the information processing apparatus;

a light source configured to illuminate keyboard symbols corresponding to areas of the sensing field; and an exterior surface covering the sensing field and obscuring the keyboard symbols from visibility unless the light source is providing illumination, the exterior surface comprising a fire retardant plastic and forming part of the vehicle.

2. The device of claim 1, further comprising depressions disposed over the exterior surface to increase friction between the exterior surface and an object in contact therewith in which the depressions have been formed by blasting the surface with particles.

3. The device of claim 1, further comprising a cylindrical recess defined in the exterior surface for receiving a beverage container therein, the exterior surface being arranged to vibrate to provide haptic feedback when a keystroke has been registered by the device.

4. The device of claim 1, wherein the light source comprises a light guide and a plurality of LEDs in optical communication with the light guide in which the LEDs emit light to illuminate the light guide and the keyboard symbols through the exterior surface.

5. The device of claim 4, wherein the port comprises a USB port in which the port receives power from the information processing apparatus when connected thereto via the cable and supplies power therefrom to the LEDs.

6. The device of claim 4, wherein the port comprises a USB port in which the port receives power from the information processing apparatus via the cable and supplies power therefrom to the LEDs for illumination thereof.

7. The device of claim 4, wherein the sensing field comprises a capacitive touch panel.

* * * * *